United States Patent [19]
Jakob

[11] 3,910,777
[45] Oct. 7, 1975

[54] ABSORPTION SYSTEM FOR SEPARATE RECOVERY OF CARBON DIOXIDE AND HYDROGEN SULFIDE IMPURITIES

[75] Inventor: Fritz Jakob, Achmuhle, Germany

[73] Assignee: Linde Aktiengesellschaft, Wiesbaden, Germany

[22] Filed: Dec. 18, 1973

[21] Appl. No.: 425,862

[30] Foreign Application Priority Data
Dec. 20, 1972 Germany............................ 2262457

[52] U.S. Cl. .............................. 55/48; 55/68; 55/73
[51] Int. Cl.² ....................................... B01D 53/14
[58] Field of Search .............. 55/48, 51, 53, 68, 73; 62/9–12, 17

[56] References Cited
UNITED STATES PATENTS

| | | | |
|---|---|---|---|
| 2,863,527 | 12/1958 | Herbert et al. ...................... | 55/73 X |
| 2,930,752 | 3/1960 | Swerdloff ............................. | 55/53 X |
| 3,453,835 | 7/1969 | Hochgesand ........................ | 55/68 X |
| 3,498,067 | 3/1970 | Ranke ................................. | 55/68 X |
| 3,505,784 | 4/1970 | Hochgesand et al. .............. | 55/68 X |
| 3,531,917 | 10/1970 | Grunewald et al. ................ | 55/73 X |
| 3,594,985 | 7/1971 | Ameen et al. ...................... | 55/73 X |
| 3,710,546 | 1/1973 | Grunewald et al. ................ | 55/73 X |
| 3,824,766 | 7/1974 | Valentine et al. .................. | 55/73 X |

Primary Examiner—Charles N. Hart
Assistant Examiner—Robert H. Spitzer
Attorney, Agent, or Firm—Millen, Raptes & White

[57] ABSTRACT

In a gas purification process comprising scrubbing out gaseous impurities comprising carbon dioxide and hydrogen sulfide from gases with an organic polar solvent scrubbing agent, said process being conducted under superatmospheric pressure, and at a low temperature, and expanding resultant loaded scrubbing agent to liberate a portion of the components dissolved therein, the improvement wherein after the expansion of the loaded solvent, the resultant expanded solvent is stripped with a stripping gas to remove the hydrogen sulfide and the resultant loaded stripping gas containing the hydrogen sulfide is scrubbed with hot-regenerated scrubbing agent to remove the hydrogen sulfide therefrom.

10 Claims, 1 Drawing Figure

U.S. Patent  Oct. 7, 1975  3,910,777
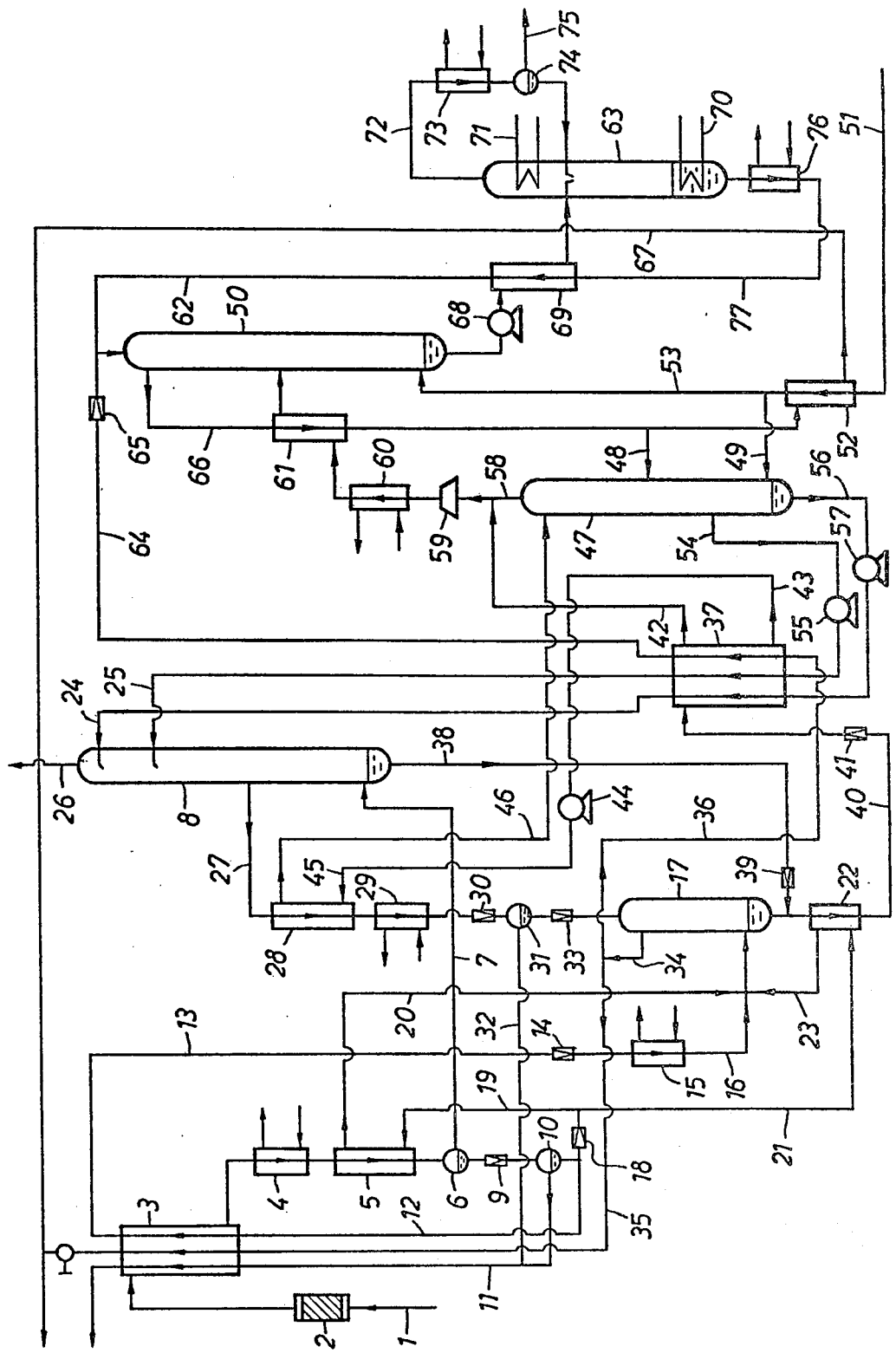

ABSORPTION SYSTEM FOR SEPARATE RECOVERY OF CARBON DIOXIDE AND HYDROGEN SULFIDE IMPURITIES

BACKGROUND OF THE INVENTION

This invention relates to a superatmospheric low temperature gas purification system for scrubbing out impurities of carbon dioxide, hydrogen, sulfide, and optionally carbon oxysulfide from gases by means of an organic polar solvent wherein the loaded solvent, after the scrubbing step, is freed of a portion of the components dissolved therein by means of expansion.

A number of purification processes are available for the removal of acidic components, such as carbon dioxide, hydrogen sulfide, or carbon oxysulfide, from industrial gases, for example, methanol and ammonia synthesis gases, as obtained from natural gas or produced from solid, liquid, or gaseous fuels.

Among the most widely used techniques are scrubbing processes, i.e., methods wherein the undesired components are removed by mass transfer into an absorbent. In these absorption processes, there are employed either chemically reactive absorbents or strictly physical absorbents which are effective solely on the basis of solubility characteristics.

The physical scrubbing processes are more economic when large quantities of gas are to be purified having relatively high contents of the acidic impurities. In these processes, organic solvents are frequently employed as the physical absorbents, methanol in particular being widely utilized. When using a physical absorbent, the amount of absorbent required for the removal of an individual component, with a given amount of raw gas, depends, in addition to the temperature-dependent solubility properties, only on the total pressure under which the scrubbing step is conducted. As a rule, the solubility of a gas in the scrubbing liquid increases with decreasing temperature and with rising pressure.

A modern design of such a methanol scrubbing system employs two stages ("Chemie-Ing.-Techn." [Chemistry-Engineering-Technology] 40th year, 1968, vol. 9/10, pp. 432–440). For this purpose, completely regenerated methanol is introduced into a scrubbing tower at the head thereof, but only partially regenerated methanol is fed to approximately the middle thereof. The gas, fed into the foot of the scrubbing column, is thus freed of the main amount of acidic components in the lower portion of the scrubbing column where it is contacted with the partially regenerated methanol. During the absorption process in the bottom part of the column, there is a significant heat of solution, and considering the desirable low temperatures for the process, the scrubbing agent is heated to an undesirably high temperature for complete effectiveness. The gas, however, in the two stage system, then rises further within the column and is sprayed with pure cold methanol in its upper section, so that the gas is withdrawn from the head of the column practically free of acidic components.

The loaded scrubbing agent is expanded in several stages in the conventional process, wherein dissolved constituents such as hydrogen liberated in the first expansion stage, are recycled into the raw gas, while the dissolved acidic components are liberated to a large extent but incompletely in subsequent expansion stages. The resultant partially regenerated scrubbing agent is then split into two streams, one stream recycled into the lower section of the scrubbing column and another stream being passed to a rectifying column for complete regeneration to remove residual acidic components. This completely regenerated portion of the scrubbing agent is then utilized in the upper section of the scrubbing column in the fine scrubbing stage.

Although the conventional process permits a gas to be extensively freed of acidic constituents, such as $H_2S$ and $CO_2$, it has the disadvantage — of significance especially in case of sulfur-rich gases — that the hydrogen sulfide cannot be separated from the carbon dioxide. This drawback not only results in exhaust gas problems, it also complicates the working up of the sulfur-enriched gases to obtain a useful product.

SUMMARY OF THE INVENTION

With reference to the prior art, it is an object of the present invention to provide an improved system, including a process and apparatus therefor, which permits not only the removal of acidic components, such as, for example, carbon dioxide, hydrogen sulfide, and optionally carbon oxysulfide, from gases, but also the recovery of these components in a manner separately from each other, thereby facilitating the further processing of the individual components.

Upon further study of the specification and appended claims, further objects and advantages of this invention will become apparent to those skilled in the art.

To attain these objects, an important aspect of the present invention resides in the removal of $H_2S$ by the steps of stripping expanded loaded solvent with a stripping gas in a stripping column or the like and then scrubbing hydrogen sulfide out of the stripping gas with hot-regenerated solvent.

In the process of this invention, the gas to be freed of acidic components after drying, compression and cooling is fed to a scrubbing column. The invention is particularly applicable to gases containing 0,5 to 65, preferably 2 to 35 mole % $CO_2$; 5 ppm to 2 mole %, preferably 5 ppm to 1 mole % $H_2S$; and 0,25 ppm to 0,1 mole %, preferably 0,25 ppm to 0,05 mole % COS.

It is beneficial to employ very high pressures in the scrubbing step since the higher the pressure of the gas during this step, the higher is the dissolving power of the scrubbing agent. Consequently, the gas conventionally has a considerable pressure, e.g. 200 atmospheres absolute. In the scrubbing column, the gas is scrubbed with a physical solvent as opposed to a chemically reactive absorbent, for example a polar organic solvent, especially with methanol. Bearing in mind that it is desirable to employ as low as possible scrubbing temperatures, it is preferred when using methanol to cool it to −50° to −70° C. For the purpose of simplicity, methanol is the organic solvent which is referred to in the following discussion. It is to be understood, however, that other organic solvents can also be used, e.g. acetone, other alcohols, such as ethanol and higher, decalin, tetraline, and trichloroethylene. In general, the scrubbing step is most preferably conducted at about 10° – 20°C above the melting temperature of the solvents.

The scrubbing column can be designed in two stages as in the above-mentioned prior art, wherein the scrubbing conducted in the lower section is conducted with only partially regenerated solvent, and in the upper section with substantially completely regenerated solvent. The methanol, loaded with the acidic components, $CO_2$ and $H_2S$, is expanded after the scrubbing step, and then warmed in heat exchange with raw gas, with partially or completely regenerated methanol, or with another suitable fraction, to a high temperature, e.g. up to $-30°C$. In this way, the major amount of the dissolved $CO_2$ is liberated, and the endothermic heat of desorption is transferred to regenerated or partially regenerated solvent whereby the solvent is brought to the required low scrubbing temperature.

According to the invention, the warmed-up methanol, which has been extensively freed of $CO_2$, is introduced into a stripping column. In the upper section of the latter, the methanol is freed of dissolved $H_2S$ by a recycled stripping gas. In the lower section of the stripping column, the scrubbing agent is freed of its residual $CO_2$ content with the aid of a foreign stripping gas. Since the methanol, prior to its entrance into the stripping column, had been extensively freed of the $CO_2$ dissolved therein, the effect of heat of solutions in the stripping column is relatively small. Thus, the temperature during the stripping stage is not lowered very much; consequently, the amount of stripping gas can be kept relatively low. The thus-regenerated methanol is again returned to the scrubbing column. In this connection, it is advantageous, in order to relieve the methanol load in the lower section of the stripping column, to withdraw a portion of the descending methanol approximately in the middle of the $CO_2$ stripping section and to utilize this portion in the lower section of the main scrubbing column as the scrubbing agent, whereas the portion of the solvent entirely freed of other components in the stripping column is introduced into the head of the main scrubbing column.

The gas withdrawn from the head of the stripping column contains, in addition to the $CO_2$ which has entered the stripping column, the entire $H_2S$ content of the raw gas. According to the present invention, this gas is cooled, approximately to a temperature of $-70°$ to $-80°C$. and then introduced into approximately the middle of a stripping-gas scrubbing column, wherein it is scrubbed with hot, i.e., entirely regenerated methanol. During the step, the $H_2S$, as the more readily soluble component, is completely scrubbed out of the stripping gas. The scrubbing agent loaded with $H_2S$ is subsequently regenerated by distillation in a rectifying column so that the hydrogen sulfide is withdrawn at the head of the column in a concentration of up to 40% or preferably up to 50% by volume, the other components in the overhead gas being predominantly $CO_2$, the rest of 1 to 2% being the components of the externally added stripping agent. In the gas withdrawn at the head of the column the concentration of $H_2S$ is in general 10 to 50 mole %, preferably 14 to 40 mole %, that of $CO_2$ in general 48 to 88 mole %, preferably 58 to 84 mole %.

The rectified solvent is then returned to the head of the scrubbing column for the stripping gas. The overhead gas of this column, consisting almost exclusively of $CO_2$, is warmed and then utilized in the stripping column for removing the $H_2S$ from the loaded solvent. In other words, this overhead gas is recycled to above the foot of the stripping column. Another stripping gas, e.g., nitrogen from an air fractionation plant, or methane, is introduced under pressure at the foot of the stripping gas scrubbing column, which has the purpose of removing $CO_2$ extensively from the $H_2S$-absorbing scrubbing agent. The more extensively the $CO_2$ is driven out, the greater is the $H_2S$ concentration in the overhead product of the rectifying column. On the other hand, the $H_2S$ concentration at the head of the stripping-gas scrubbing column also rises, which, in turn, is undesirable, so that only a moderate stripping of the solvent is all that is conducted within said column. The stripping of the solvent is performed in such a way that in the sump liquid $H_2S$ and $CO_2$ remain in a proportion of 1 : 1 to 1 : 4.

In accordance with a preferred embodiment of this invention, the two columns, namely the stripping column and the scrubbing column for the stripping gas, are operated at very different temperatures. The scrubbing column for the stripping gas is operated at a temperature at about 40°–60°C lower than the temperature of the stripper. This is an important advantage, since the secondary methanol cycle, which is to be regenerated in the hot state, can thus be considerably smaller than the main cycle regenerated by expansion and stripping. This represents a considerable saving in energy and initial investment costs.

In addition to providing a highly concentrated $H_2S$ fraction, the present invention also permits the production of a pure $CO_2$ fraction, assuming the raw gas contains sufficient $CO_2$, so that it is worthwhile to conduct a working-up step, and if there is a demand for the $CO_2$. However, the process of this invention is not limited to the simultaneous production of $H_2S$ and $CO_2$, but rather also permits the manufacture of a highly concentrated $H_2S$ fraction by itself.

In order to obtain a separate $CO_2$ fraction, the major portion of the loaded solvent is withdrawn from approximately the lower third of the main scrubbing column, so that only a minor quantity travels through the entire length of the column. The sidestream main portion of the solvent contains hardly any $H_2S$, since the $H_2S$ has a markedly higher solubility in methanol and thus is scrubbed out by the residual methanol in the lowermost parts of the main scrubbing column. For this reason, the $CO_2$-containing scrubbing agent withdrawn at a higher level is suitable for removing the $H_2S$ from all $CO_2$ fractions present in the gaseous form. This is effected most advantageously in a secondary scrubbing column where the $CO_2$ fractions are passed upwardly from the bottom countercurrently to this scrubbing agent. The purified $CO_2$ fraction withdrawn from the head of this secondary scrubbing column can then be passed on to other uses.

It is particularly preferred to branch off a portion of this purified $CO_2$ overhead fraction and to add same to the hot-regenerated scrubbing agent flowing to the head of the stripping-gas scrubbing column after an appropriate cooling thereof so that it is in the liquid phase, thereby covering the cold losses in the secondary cycle having the lowest temperatures in the system, and limiting the $CO_2$ absorption of the hot-regenerated methanol and thus the temperature increase in the stripping-gas scrubbing column.

DESCRIPTION OF THE PREFERRED EMBODIMENT

The invention will now be described in even greater detail with reference to the attached drawing which is a schematic flowsheet of the preferred embodiment of this invention. It is to be understood, however, that this embodiment is not intended to limit the appended claims. (When the term "expanded" is employed in connection with the throttling of liquids, pressure reduction is the primary manifestation if vapor is not formed.)

Via conduit 1 and dryer 2, 1,000 Nm³/h of raw gas is fed to a main heat exchanger 3 under a pressure of 120 atm. abs. and at a temperature of 40°C. The raw gas has the following composition:

| | | |
|---|---|---|
| $H_2$ | 60.9 | mole % |
| $N_2$ | 0.1 | " |
| CO | 4.0 | " |
| Ar | 0.3 | " |
| $CH_4$ | 1.3 | " |
| $CO_2$ | 33.0 | " |
| $H_2S$ | 0.4 | " |

The raw gas is then cooled in cooler 4 against cold ammonia and in heat exchanger 5 against $H_2S$-containing $CO_2$ to a temperature of −50°C; during this step, a portion of the $CO_2$ and $H_2S$ contained in the gas is liquefied. In the separator 6, the liquid is separated from the raw gas. The latter is conducted through conduit 7 into a main scrubbing column 8, while the liquid fraction is expanded in a throttle 9 to 20 atm. abs., thereby desorbing dissolved $H_2$ primarily. Liquid and gas are separated from each other in the separator 10. The hydrogen (35 Nm³/h) is passed as recycle gas through conduit 11 and transmits its cold in the main heat exchanger 3 to entering raw gas. After compression (not shown) the hydrogen is admixed to the raw gas.

The liquid from separator 10 is divided into two partial streams, one of which (108 Nm³/h) is conducted via conduit 12 to the main heat exchanger 3, where this stream is evaporated and warmed up to 20°C. From there, the stream passes via conduit 13 through expansion valve 14, where it is expanded to 6 atm. abs., then to the ammonia cooler 15 and from there, via conduit 16, into a secondary scrubbing column 17. The other partial stream is expanded in a throttle 18 to 6 atm. abs. and again divided. One part (121.9 Nm³/h) is conducted through conduit 19 to the heat exchanger 5 and is vaporized and heated therein, whereafter it passes through conduit 20 likewise into the secondary scrubbing column 17. The other part (39.1 Nm³/h) flows through conduit 21 to a heat exchanger 22, is vaporized and warmed therein and then passes through conduit 23 also into the secondary scrubbing column 17.

The raw gas entering the main scrubbing column 8 via conduit 7 is scrubbed therein with methanol under a pressure of 120 atm. abs. Via conduit 24, 0.21 t/h of entirely regenerated methanol is introduced at a temperature of −60°C. to the head of the main scrubbing column 8. At a point somewhat below the head of the column, 0.21 t/h of partially regenerated methanol is introduced via conduit 25, likewise with a temperature of −60°C. Via conduit 26 at the head of the column 8, there is withdrawn 622 Nm³/h of a gas freed of $CO_2$ and $H_2S$ except for traces on the order of 20 p.p.m. of $CO_2$ and 1 p.p.m. of $H_2S$ at a temperature of −50°C. (The gas is passed on, for example, to a high-pressure nitrogen scrubbing stage, where the hydrogen contained in the gas is freed of lower-boiling impurities, such as carbon monoxide, for example, and converted into an ammonia synthesis gas.) In the main scrubbing column 8, the hydrogen sulfide is scrubbed out in the lower third of the column, while the $CO_2$, due to its lower solubility, rises to the upper section of the column.

Via conduit 27, 0.372 t/h of $CO_2$-loaded, but $H_2S$-free scrubbing agent is withdrawn at a temperature of −20°C., which is cooled in heat exchanger 28, further cooled in ammonia cooler 29, and expanded in a throttle 30 to a pressure of 20 atm. abs. thereby liberating dissolved hydrogen primarily. The liquid and gaseous phases are separated in separator 31. Via conduit 32, 15.9 Nm³/h of $H_2$ is removed, then combined in conduit 11 with the gas from the separator 10, thereby resulting in an amount of return gas of 50.9 Nm³/h. The liquid from separator 31 is expanded to 6 atm. abs. in a throttle 33 and enters the head of the secondary scrubbing column 17 at a temperature of −38.4°C. The $H_2S$-containing $CO_2$ vapors flowing through conduits 16, 20 and 23 to column 17, flow countercurrently to the $CO_2$-loaded scrubbing agent flowing from the top toward the bottom and these vapors are freed of $H_2S$, since the scrubbing agent entering the column is substantially $H_2S$-free. As a consequence, 257.4 Nm³/h of $H_2S$-free $CO_2$ is withdrawn at a temperature of −40°C from the head via conduit 34. The largest portion by far, namely 238.4 Nm³/h, is the product and passes via conduit 35 to the main heat exchanger 3 to transfer its refrigeration values therein. The remainder of the $H_2S$-free $CO_2$ flows through conduit 36 into a heat exchanger 37 and from there is employed as described below.

The smaller portion of the scrubbing agent flowing through the main scrubbing column 8, namely 0.048 t/h, which has absorbed, in the lower portion of the scrubbing column, the entire hydrogen sulfide from the raw gas, flows through conduit 38 at a temperature of −40°C, is expanded in valve 39 to a pressure of 6 atm. abs., is combined with the scrubbing agent withdrawn from column 17, having a temperature of −30.5°C and then enters the heat exchanger 22.

The combined scrubbing agent at a temperature of −52°C is passed via conduit 40 to valve 41 where it is expanded to a pressure of 1.5 atm. abs., thus being cooled to −62.5°C, and is then passed to the heat exchanger 37. The major proportion of the carbon dioxide dissolved in the solvent is liberated by expansion and heating in heat exchanger 37, the heat being required for this purpose being withdrawn from the solvents flowing through conduits 24 and 25, which are the partially regenerated and completely regenerated solvents, respectively. The $CO_2$/$H_2S$ gaseous mixture, thus separated by evaporation, flows off from heat exchanger 37 via a conduit 42.

The remaining solvent in heat exchanger 37, which is still partially loaded is passed through conduit 43 to a pump 44 and from there, via conduit 45, to the heat exchanger 28, from where the solvent is introduced, via conduit 46, to the head of a stripping column 47 at a temperature of −30°C. Stripping gases are introduced into the stripping column 47 in the middle via conduit 48 and at the foot via conduit 49. The column is under a pressure of 1.3 atm. abs.

The stripping gas fed via conduit 48 is obtained from a stripping-gas scrubbing column 50; the stripping gas introduced via conduit 49 is a foreign stripping gas, (i.e. gas obtained from outside the process) e.g. nitrogen, fed externally via conduit 51 in an amount of about 50 Nm³/h. The foreign stripping gas is cooled in heat exchanger 52 and subdivided into two approximately equal partial streams. One partial stream flows through conduit 49 into the stripping column 47; the other flows through conduit 53 into the foot of the stripping-gas scrubbing column 50. In the upper portion of the stripping column 47, the descending solvent is freed of $H_2S$, and in the lower part, the solvent is then freed of $CO_2$.

Solvent which is free of $H_2S$ and extensively freed of $CO_2$ is withdrawn via conduit 54 and compressed with the aid of a pump 55 to the scrubbing pressure of 120 atm. abs. ambient in the main scrubbing column 8; during this step, the solvent is warmed to −28.7°C. The solvent is then cooled in heat exchanger 37 to −60°C and fed via conduit 25 into the central section of the scrubbing column 8.

The solvent at the bottom of the stripping column entirely freed of $CO_2$ by means of the stripping gas entering in conduit 49, is then removed via conduit 56 and is likewise compressed to the pressure of 120 atm. abs. in pump 57, during which step it is likewise warmed from −40°C to −28.7°C. This solvent is then likewise cooled to −60°C in heat exchanger 37 and passes via conduit 24 to the head of the main scrubbing column 8.

A mixture of stripping gas, $H_2S$, $CO_2$, and gas from heat exchanger 37, admixed via conduit 42, is withdrawn from the head of column 47 via conduit 58. This mixture has a temperature of −30°C and is further conveyed by means of a blower 59, the heat of compression being removed in the $NH_3$ cooler 60. It is then cooled to −74°C in heat exchanger 61 and fed to the middle of the stripping-gas scrubbing column 50. In this column, the gaseous mixture is conducted countercurrently to scrubbing agent in an amount of 0.21 t/h, which scrubbing agent is fed via conduit 62 at a temperature of −79.5°C and which has been hot-regenerated in a rectifying column 63. The scrubbing agent serves the purpose of scrubbing out the entire hydrogen sulfide from the gaseous mixture. $H_2S$-free $CO_2$, liquefied in heat exchanger 37, and expanded in a throttle 65 to a pressure of 1.5 atm. abs. can be added in an amount of 19 $Nm^3/h$ to the scrubbing agent prior to entrance into the column 50; this $CO_2$ is fed via conduit 64. This step on the one hand improves the refrigeration economy of the column 50, and on the other hand, results in an extensive charging of the hot-regenerated solvent with $CO_2$. As a consequence, the entire $H_2S$ in the loaded stripping gas, but only a very small amount of the $CO_2$ therein is dissolved in the absorbent in column 50. From the head of column 50, $H_2S$-free $CO_2$ is withdrawn via conduit 66 at a temperature of −79°C; it is then warmed in heat exchanger 61 to −33°C, and thereafter is, in part, introduced via conduit 48 as stripping gas into the stripping column 47 and, in part, warmed in heat exchanger 52 and combined via conduit 67 with the $H_2S$-free $CO_2$ flowing through conduit 35, to form an amount of 351.7 $Nm^3/h$ of $H_2S$-free $CO_2$.

From the foot of the stripping-gas scrubbing column 50, 0.21 t/h of $H_2S$-loaded scrubbing agent is discharged at a temperature of −83°C. Due to the stripping gas introduced via conduit 53, the scrubbing agent has been freed of a considerable portion of the previously dissolved $CO_2$. The scrubbing agent is conveyed by means of a pump 68 to a heat exchanger 69, warmed therein, and passed to the upper section of the rectifying column 63. The rectifying column 63 is equipped, at the foot, with a steam heating unit 70 and, at the head, with a water cooling unit 71. Furthermore, a condensate conduit 72 is arranged at the head of the rectifying column 63, in which are inserted an ammonia cooler 73 and a separator 74.

In the ammonia cooler 73, the vapors discharged from the head of the rectifying column at a temperature of +40°C are cooled to −40°C and the thus-produced condensate from separator 74 is reintroduced into the column 63, while the proportion which remains in the gaseous phase, namely $H_2S$ in a concentration of 40–50% and in an amount of 13 $Nm^3/h$, is withdrawn via conduit 75. In the rectifying column 63, the $H_2S$-loaded scrubbing agent is freed of $H_2S$; as mentioned above, this $H_2S$ is then withdrawn via conduit 75. The column is under a pressure of about 2 atm. abs. The completely regenerated scrubbing agent is discharged at the foot of column 63, precooled in water cooler 76 and is then passed through conduit 77 into the heat exchanger 69 from where it is passed at a temperature of −80.3°C through conduit 62 to the stripping-gas scrubbing column 50. If COS is present in the raw gas it appears together with $H_2S$ in the product. However, the process as such need not be altered.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a gas purification process comprising in a first scrubbing column, scrubbing out gaseous impurities comprising carbon dioxide and hydrogen sulfide from gases with an organic polar solvent scrubbing agent, said process being conducted under superatmospheric pressure and at a low temperature, and expanding resultant loaded scrubbing agent to liberate a portion of the components dissolved therein, the improvement wherein after the expansion of the loaded solvent, the resultant expanded solvent is stripped with a $H_2S$-removing stripping gas obtained from outside the process to remove the hydrogen sulfide from said resultant expanded solvent, recycling the stripped-out scrubbing agent without further regeneration to said first scrubbing column, scrubbing the resultant loaded stripping gas containing the hydrogen sulfide with thermally completely regenerated scrubbing agent in a second scrubbing column separate and distinct from said first scrubbing column to remove the hydrogen sulfide therefrom, and thermally and completely regenerating the resultant loaded scrubbing agent to form said thermally and completely regenerated scrubbing agent.

2. A process according to claim 1 wherein the hydrogen sulfide is scrubbed out of the stripping gas at a substantially lower temperature than the stripping of the hydrogen sulfide from the expanded solvents.

3. A process according to claim 1 wherein the loaded solvent, prior to expansion, is subdivided into a portion primarily loaded with $CO_2$ and into a portion loaded with $CO_2$ and $H_2S$.

4. A process according to claim 3 wherein the portion of the solvent primarily loaded with $CO_2$ is utilized for washing out $H_2S$ from an $H_2S$-$CO_2$ fraction.

5. A process according to claim 1 wherein $CO_2$ is employed as the stripping gas.

6. A process according to claim 1 wherein $CO_2$ and a foreign gas are utilized as the stripping gas.

7. A process according to claim 1 wherein, as the stripping gas, that gas is utilized from which the $H_2S$ has been scrubbed out with the hot-regenerated solvent.

8. A process according to claim 1 wherein the additional stripping gas is introduced while scrubbing out the $H_2S$ from the stripping gas.

9. A process according to claim 1 further comprising distilling resultant hot-regenerated solvent containing scrubbed out hydrogen sulfide to regenerate the solvent and recover the hydrogen sulfide as an overhead gas.

10. A process according to claim 1 wherein said stripping gas is nitrogen or methane.

* * * * *